April 20, 1943.  W. JOSEPHIAN  2,317,064
TANK TRUCK
Filed Jan. 14, 1942
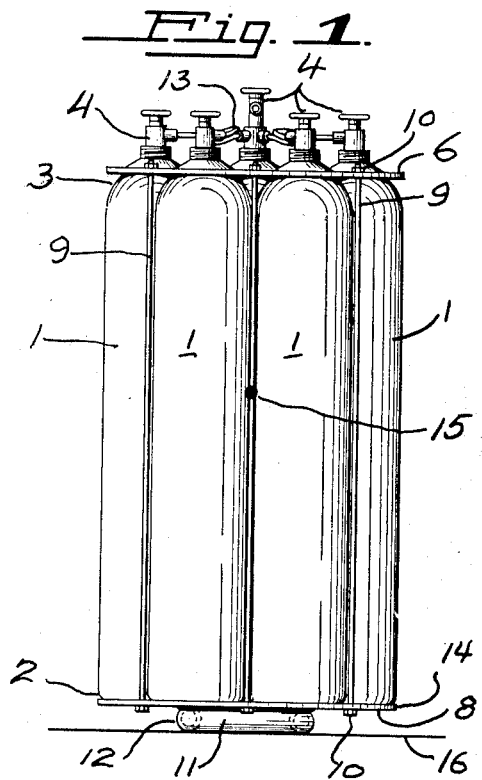
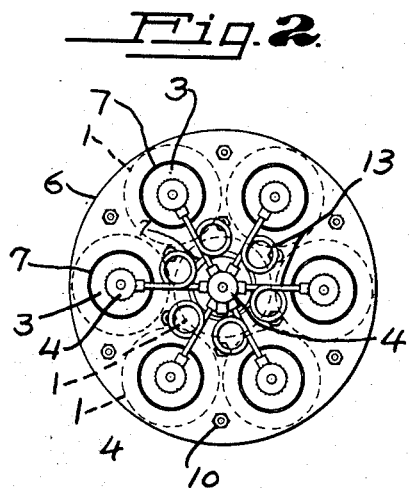
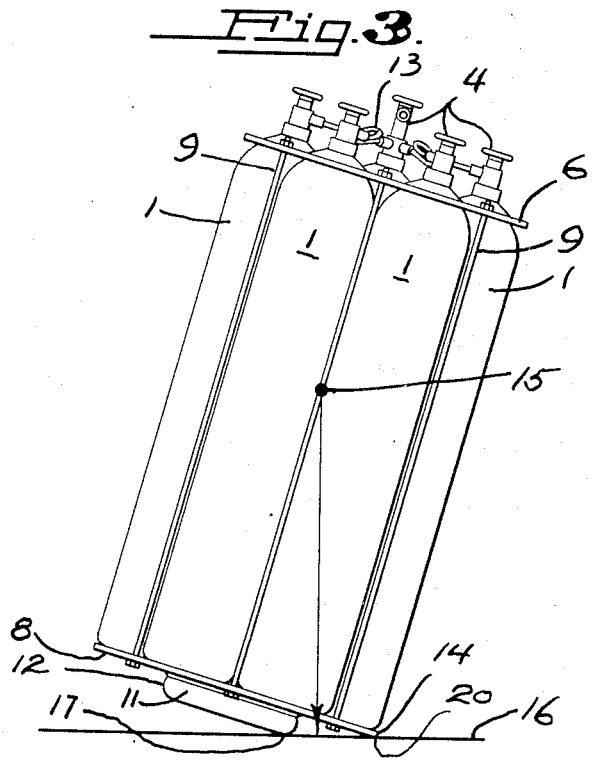
INVENTOR,
WILLIAM JOSEPHIAN.
BY
Lippincott & Metcalf
ATTORNEYS.

Patented Apr. 20, 1943

2,317,064

UNITED STATES PATENT OFFICE 2,317,064

TANK TRUCK

William Josephian, Oakland, Calif.

Application January 14, 1942, Serial No. 426,725

7 Claims. (Cl. 280—1)

My invention relates to cylindrical tank trucks and more particularly to a device whereby a plurality of cylindrical tanks can be handled as a unit.

Among the objects of my invention are: To provide a simple and efficient truck for handling a plurality of cylinders; to provide a means for easily handling a plurality of heavy cylinders containing a usable gas; to provide a means for assembling a plurality of cylinders into an easily movable unit, and to provide a simple and efficient truck for handling gas cylinders, such as oxygen, hydrogen, acetylene, carbon dioxide tanks, or the like.

While I wish to describe my invention as being particularly applicable to the conveying of heavy gas cylinders such as oxygen tanks, for example, for use in welding, I wish it to be distinctly understood that my invention is applicable to handling other and similar tanks for whatever purpose is desired.

In welding, large amounts of oxygen gas are utilized. This gas is customarily delivered to the user in elongated cylindrical tanks having a relatively flat bottom and a convex top, terminating in a gas valve and pipe connection, whereby the gas may be withdrawn as desired from the tanks. Oxygen is customarily stored in gaseous form in such tanks at a pressure of approximately 2000 pounds per square inch. These tanks must, of necessity, be relatively heavy to withstand the high pressure.

Furthermore, welding operations at the present time may be extensive and single tanks, while relatively easily moved, are not sufficient in many cases to supply the amount of oxygen required. Consequently, a plurality of separate tanks are customarily manifolded into a single oxygen line. Tank replacements should be as infrequent as possible, in order to avoid interruption of service. A plurality of separate tanks, however, involves a great deal of handling. It is a main object of my present invention to provide a means whereby a plurality of tanks as, for example, seven tanks, which may be clamped together so that they may be delivered and replaced as a unit. However, seven oxygen tanks weigh in the neighborhood of one thousand pounds and are not readily adapted therefore for direct handling.

It is another object of my present invention to provide means for clamping a plurality of tanks into a unit which can be readily moved from place to place by tilting and rolling, together with means for reducing the danger of upset. Under these conditions, the tanks are easily handled, and even though the unit weighs in the neighborhood of a thousand pounds, the unit can be readily moved by tilting and rolling without danger of the unit overturning.

My invention broadly therefor, is the grouping of several cylinders into a manoeuverable unit capable of being handled by one man, and spotted easily without the aid of any mechanical device. The unit will not lose balance and tip over, and can be filled as one cylinder, emptied as one cylinder and delivered as one cylinder.

In the drawing:

Fig. 1 is a side view in elevation, of one preferred form of my invention.

Fig. 2 is a top view of the device shown in Fig. 1.

Fig. 3 is a side view showing how the unit of Fig. 1 may be tilted into a second stable position.

My invention may be more clearly understood by direct reference to the drawing.

In Fig. 1 a plurality of elongated cylinders, such as for example, oxygen tanks 1, each of which is provided with the usual substantially flat bottom 2 and convex top 3 terminating in a control valve and outlet 4. Preferably, seven tanks are utilized per unit, although various numbers can be utilized as desired. A top plate 6 is provided, this plate having apertures 7 therein through which valves 4 project, with the edges of apertures 7 resting firmly against the convex tops 3 of the cylinders. The bottoms 2 of the cylinders rest on a bottom plate 8 in stable position. Top and bottom plates 6 and 8 are rigidly tied together to clamp the cylinders therebetween by inner and outer tie rods 9 joining the plates between adjacent cylinders, and secured by nuts 10. The tanks are thus firmly clamped between upper and lower plates 6 and 8 and cannot move out of position. When so clamped together, all of the outer valved outlets 4 can be joined to the central valved outlet 4 by a manifold 13 so that the tanks can be filled and emptied as a unit if desired.

Such an assembly of seven tanks, for example, will weigh approximately one thousand pounds, and under normal circumstances would be difficult to move. However, in order to facilitate movement of the unit, I provide on the bottom plate 8, a circular track 11 having a rounded periphery 12. The circular track 11 is coaxially positioned with respect to the assembled tanks and may be, if desired, formed by bending a circle out of heavy pipe and welding the circle to the bottom of lower plate 8. The tanks as a unit may then be tilted and rolled on track 11, as desired, without the application of any great amount of force to the unit. This is accomplished by the proper positioning of track 11 with respect to the center of gravity of the unit, and with respect to the periphery 14 of lower plate 8.

If, for example, we assume the center of gravity of the unit to be in the general position, as indicated by the spot 15 in Fig. 1, it will be seen that the track unit rests in a perfectly stable position with the entire periphery of circular track 11 resting on a support 16. If the unit is then tilted by hand, for example, the tank can tilt into a second stable position as shown in Fig. 3, without the application of any great amount of force. The unit will now be resting on one point only of the rounded periphery 12 of track 11, and one point on the periphery 14 of plate 8, with the center of gravity between a vertical line projected vertically upwardly from the track contact 17 with the support 16, and a line projected vertically upwardly from contact 20 between the periphery 14 of plate 8 and the support 16. Under these conditions, a second and preferably greater application of force will be necessary in order to tilt the unit still further laterally, so that the center of gravity 15 passes outside of the vertical line extended upwardly from contact point 20, with consequent danger of upset.

For movement, the unit may be tilted so that the center of gravity 15 is almost directly over the track contact 17 with the support 16, before the contact 20 has been made. Under these conditions the tank unit can be rotated relatively easily, and thereby made to travel along a predetermined path, with the assurance that whichever way the tank unit happens to tilt upon release, it will reach a stable position, either the upright stable position shown in Fig. 1, or the tilted stable position shown in Fig. 3.

Under these conditions, the heavy unit may be easily moved, with a minimum of danger of unit upset and consequent injury of the person handling the unit.

I wish it to be distinctly understood that the drawing given herewith is illustrative only, and that the relative diameters of track 11 and lower plate 8 may be varied as desired to control the amount of force necessary.

(1) to tilt the unit into the tilted stable position where the center of gravity thereof is between contacts 17 and 20, and (2) to tilt the unit past the position shown in Fig. 3 to upset the unit. For example, the force laterally applied to tilt a one thousand pound unit into the tilted stable position may be made to be as low as thirty-five pounds, whereas the force thereafter required to completely overturn the tank may be made more than double that amount, for example, seventy-five pounds.

In any event, the advantageous result of my invention can be accomplished by so designing the lower plate and its attached track, so that there will be a second stable position, such as that shown in Fig. 3 after the tank has been tilted. This simply means that the center of gravity 15 is to lie between vertical lines erected from contacts 7 and 20.

Various units may have different track diameters for specific purposes. It will be obvious, however, that the smaller the diameter of track 11 the greater number of rotations of the unit as a whole have to be made to travel the unit a predetermined distance, and conversely, the larger the diameter is, the fewer revolutions are necessary to travel the unit the same distance.

My invention may be fully attained, therefore, merely by the provision of relative contact and center of gravity relationships as above set forth, irrespective of the actual dimensions.

I claim:

1. A truck for handling a plurality of cylindrical tanks comprising an upper plate and a lower plate, means for clamping a plurality of parallel cylindrical tanks between said plates, and a circular base connected with said lower plate in coaxial relation thereto and of lesser diameter than said lower plate, the periphery of said base forming a rolling contact with a support when said truck is tilted, said truck having a stable position when resting on said periphery and the edge of said lower plate only.

2. A truck for handling a plurality of cylindrical tanks comprising a base plate, means for holding a plurality of cylindrical tanks in fixed upright position on the top of said plate, and a basal member fastened to the bottom of said plate and having a circular periphery centrally located with respect to the periphery of said plate to support said truck in upright stable position, said truck having a second stable position when tilted to rest on both of said peripheries only.

3. Apparatus in accordance with claim 2 wherein the relative diameters of said base and said plate are proportioned so that said truck can be tilted from the upright stable position into the second stable position by application of a force less than that required to upset said truck from said second stable position.

4. Apparatus in accordance with claim 2 wherein the periphery of said base is rounded to facilitate rolling of said truck on a support when tilted to a position intermediate the two recited stable positions.

5. Apparatus in accordance with claim 2 wherein said base is formed by a circular member of circular cross section.

6. Apparatus in accordance with claim 2 wherein said base is a pipe formed into a circle and welded to said disc.

7. Apparatus in accordance with claim 1 wherein said tanks have upper outlets, of lesser diameter than the main bodies thereof, and wherein said upper disc is apertured to rest on said bodies with said outlets projecting above said upper disc for manifolding.

WILLIAM JOSEPHIAN.